US005657478A

United States Patent [19]

Recker et al.

[11] Patent Number: 5,657,478

[45] Date of Patent: Aug. 12, 1997

[54] METHOD AND APPARATUS FOR BATCHABLE FRAME SWITCH AND SYNCHRONIZATION OPERATIONS

[75] Inventors: John Recker, Sunnyvale; Walter Donovan, Milpitas, both of Calif.

[73] Assignee: Rendition, Inc., Mountain View, Calif.

[21] Appl. No.: 648,680

[22] Filed: May 16, 1996

[51] Int. Cl.$^{6}$ .................................................. G06F 15/16

[52] U.S. Cl. ......................... 395/503; 395/508; 395/522; 345/201

[58] Field of Search .................................. 395/162–166, 395/427, 431–433, 502, 503, 508, 509, 510, 522, 515; 345/24, 27, 112, 114, 133, 185, 189, 201, 213

[56] References Cited

U.S. PATENT DOCUMENTS 5,299,309 3/1994 Kuo et al. .............................. 395/163

5,519,825 5/1996 Naughton et al. ...................... 395/152

5,543,824 8/1996 Priem et al. ........................... 395/164

*Primary Examiner*—Kee M. Tung

*Attorney, Agent, or Firm*—Blakely, Sokoloff, Taylor & Zafman

[57] ABSTRACT

A system and method that avoids performance bottlenecks at the host processor while avoiding tearing of the displayed image. In one embodiment, the system is composed of the host processor, a first in first out (FIFO) buffer, a co-processor, multiple frame buffers, a display controller and a display. The host and the co-processor are configured to enable the host to selectively batch graphic commands to the co-processor. The small set of commands provides the flexibility to selectively batch commands and selectively synchronize the host processor to the co-processor.

14 Claims, 4 Drawing Sheets

FIG. 2A

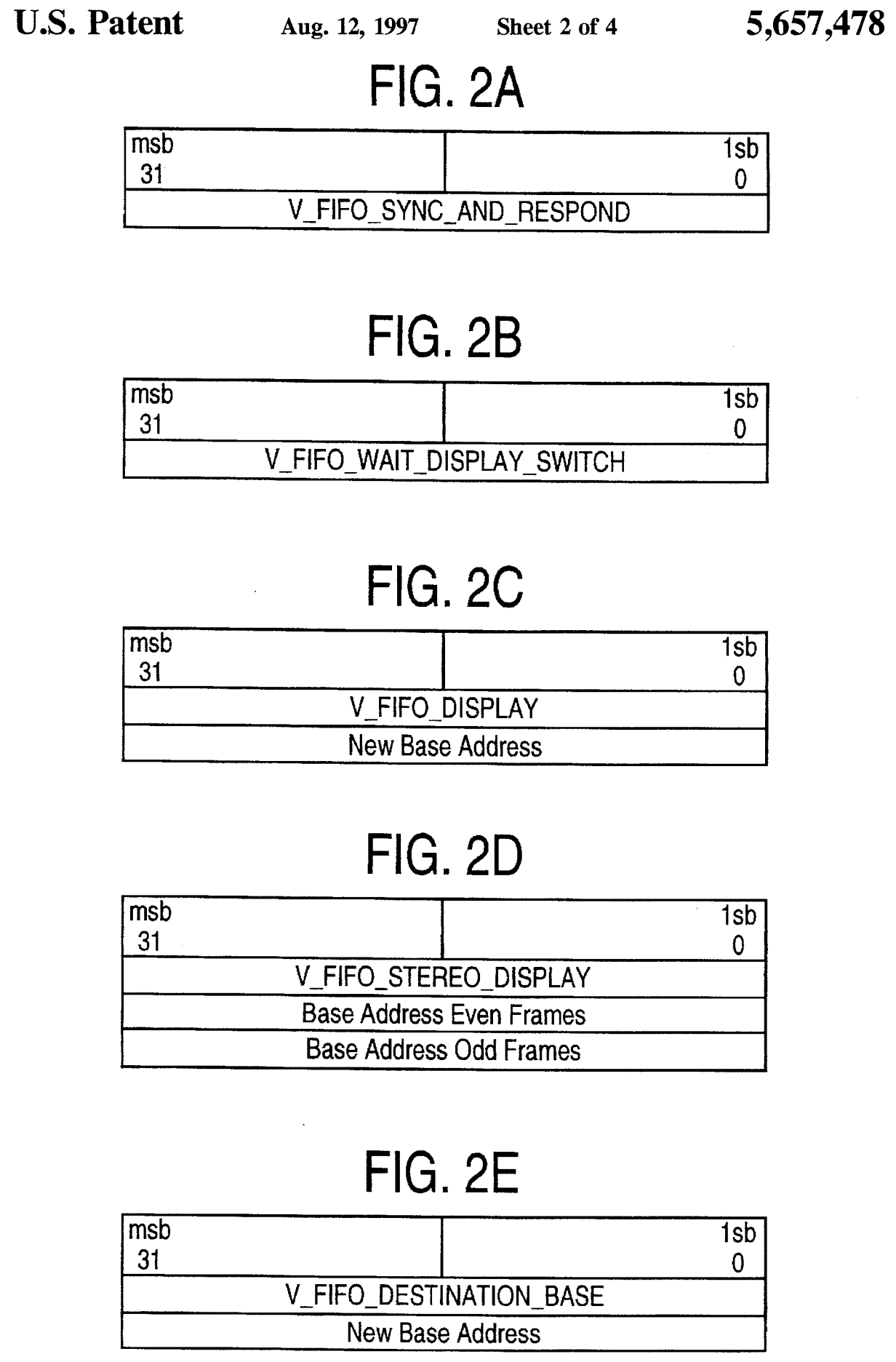

| msb 31 | lsb 0 |
|---|---|
| V_FIFO_SYNC_AND_RESPOND | |

FIG. 2B

| msb 31 | lsb 0 |
|---|---|
| V_FIFO_WAIT_DISPLAY_SWITCH | |

FIG. 2C

| msb 31 | lsb 0 |
|---|---|
| V_FIFO_DISPLAY | |
| New Base Address | |

FIG. 2D

| msb 31 | lsb 0 |
|---|---|
| V_FIFO_STEREO_DISPLAY | |
| Base Address Even Frames | |
| Base Address Odd Frames | |

FIG. 2E

| msb 31 | lsb 0 |
|---|---|
| V_FIFO_DESTINATION_BASE | |
| New Base Address | |

METHOD AND APPARATUS FOR BATCHABLE FRAME SWITCH AND SYNCHRONIZATION OPERATIONS

PRIORITY

This application claims the benefit of U.S. Provisional Application No. 60/002,626 filed on Aug. 22, 1995.

BACKGROUND OF THE INVENTION

1. Field of the Invention

The system and method of the present invention is directed to the field of computer graphics. More particularly, the present invention is directed to a system and method for rendering images in a multi-frame buffer system.

2. Art Background

A typical method for creating animated computer graphics renderings is to alternate the rendering of frames of the animation between two separate memory buffers. While one memory buffer is updated with new graphics data for a new frame in the animation, the previously rendered frame is sent to a display device by a display controller using data stored in the second memory buffer. As new frames are created, the buffer used for rendering and the buffer used to update the display are swapped. This process is commonly referred to as double buffering.

Care must be exercised when swapping buffers or "tearing" of the display can occur. Tearing occurs in one of two situations: either the source for the display controller data is swapped in mid-frame, or data is updated in the frame being displayed, causing the display to show part of one frame and part of the other.

One solution to this problem is to allow the display controller to switch buffers only after completing the display of the buffer. However, processor cycles are wasted if the processor controlling the rendering process must wait for the display controller to complete displaying a single frame.

SUMMARY OF THE INVENTION

The present invention provides a system and method that allows a host processor to avoid performance bottlenecks and tearing of the display by selectively offloading delays to a graphics co-processor. The system is composed of the host processor, a first-in-first-out (FIFO) command buffer, a co-processor, multiple frame buffers and a display controller to control the display. The host and the co-processor are configured to enable the host to selectively batch graphic commands through the command FIFO to the co-processor. The small set of commands provide the flexibility to selectively batch commands and selectively synchronize the host processor to the co-processor. These commands include commands to switch display frame buffers from which the display controller generates a display and to switch destination frame buffers to which the image is rendered.

By enabling the host to selectively batch graphics commands, delays at the host incurred by, for example, waiting until a vertical retrace interval occurs, is avoided unless the host explicitly intends to wait for such an event to occur. Thus, efficiency and flexibility are achieved.

In one embodiment, the host communicates commands to the co-processor through a FIFO buffer. The commands include switching the frame buffer to which rendering commands are performed, switching the frame buffer from which the display is generated, waiting until the vertical retrace interval occurs on the display and waiting until the co-processor is idle and signaling the host processor that the co-processor is idle. By combining the above commands in certain sequences, the host can selectively batch rendering commands and frame switching commands without incurring the tearing effects that occur in prior art devices.

BRIEF DESCRIPTION OF THE DRAWINGS

FIG. 2*a*, 2*b*, 2*c*, 2*d*, and 2*e* are illustrative commands that operate in accordance with the teachings with the present invention.

DETAILED DESCRIPTION

In the following description, for purposes of explanation, numerous details are set forth in order to provide a thorough understanding of the present invention. However, it will be apparent to one skilled in the art that the specific details are not required in order to practice the present invention. In other instances, well known electrical structures and circuits are shown in block diagram form in order not to obscure the present invention unnecessarily.

Figure 1:
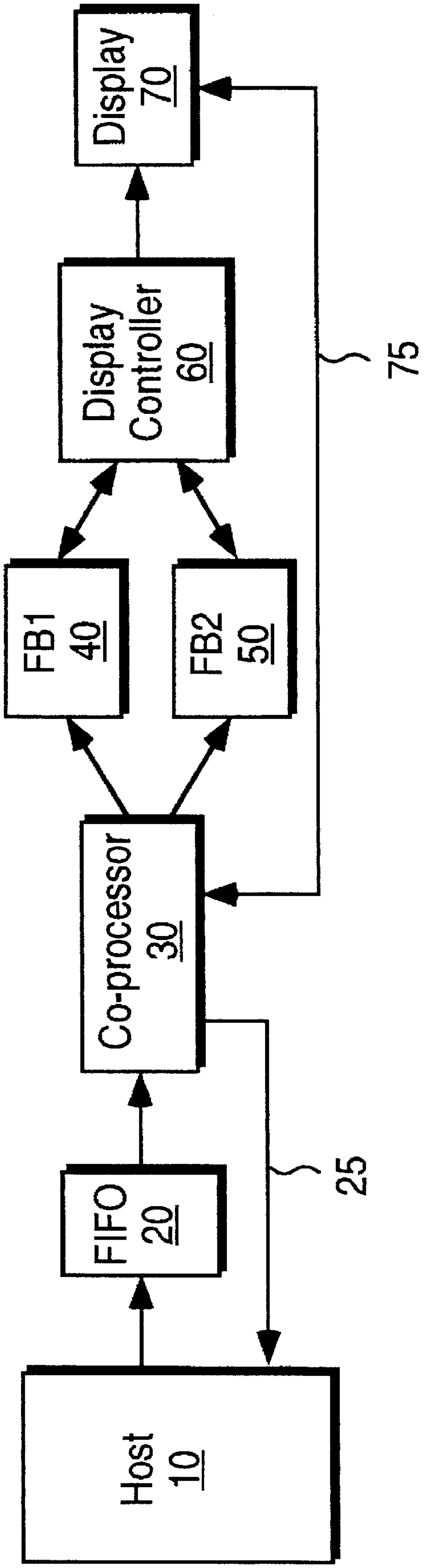
FIG. 1 is a block diagram illustration of one embodiment of the system of the present invention.

A simplified block diagram of the one embodiment of the system of the present invention is shown in FIG. 1. The system includes host processor 10, first-in-first-out (FIFO) buffer 20, co-processor 30, a first frame buffer 40, second frame buffer 50, display controller 60 and display 70.

The host processor 10 generates graphics rendering and display commands and communicates them to co-processor 30 for execution. To enable in part the batching of the commands such that the host 10 does not need to wait for completion of commands by the co-processor 30, a buffer 20 is included. Although a FIFO buffer is described herein, it is apparent that other types of buffering may be used, including buffering that is located within the co-processor 30 or host processor 10.

In the present embodiment, the host processor 10 writes the commands to a memory located local to the host 10. The host then instructs a DMA mechanism (not shown) to transfer the commands to be performed by the co-processor 30 to the FIFO buffer 20. The co-processor 30 then accesses the FIFO buffer 20 in sequence to perform the commands transmitted by the host processor 10.

The co-processor 30 performs a number of functions, including rendering of graphics commands, the results of which are stored in either the first frame buffer 40 (FB1) or second frame buffer 50 (FB2). The display controller 60 also accesses FB1 40 and FB2 50 to generate the signals to control the information that is generated on the display 70. The process of rendering, i.e., drawing pixels, to the frame buffer and the operation of the display controller 60 are well known in the art and will not be discussed further here. However, it should be noted that communication between the co-processor 50 and display controller 60 include, for example, communications to the display controller to switch the frame buffer accesses to generate the display and communicate to the co-processor 50 when a frame buffer switch occurs. As will be described below, the host 10 communicates a variety of commands to co-processor 30 to enable the batching of graphics commands, including commands that perform frame buffer switches for rendering and for display.

Exemplary commands are shown in FIG. 2*a*–2*e*. FIG. 2*a* illustrates an example of one command sent by the host to the co-processor, which, when executed by the co-processor, will wait until the co-processor is idle, and send a signal back to the host processor. This allows explicit synchronization between the host processor and the graphics processor as this command can be utilized in conjunction with other commands that cause the graphics co-processor to wait or delay execution of subsequent commands. Thus, the host can be aware of those delays and accordingly wait for completion of all commands before proceeding with the issuance of new commands. This is particularly useful for performing time critical commands as well as avoiding synchronization problems when directly accessing the frame buffers from the host processor.

FIG. 2*b* illustrates the wait until display switch command which, when executed by the co-processor, causes the co-processor to wait until the display switch occurs. If the switch has already has occurred, the function completes immediately. System flexibility is achieved when this command is executed in sequence with a command that performs a switch of frame buffers used for display. In particular, if this command is executed subsequent to a command that switches frame buffers, the co-processor waits until the frame switch has completed before executing the next command in the buffer. Thus, tearing is avoided. If there is no need for the co-processor to wait, e.g., to ensure against tearing, then the wait until display switch command is not used.

In one embodiment, the hardware determines if either (a) a display switch has occurred some time in the past or (b) the last frame has been displayed at least once. If the hardware determines that a display switch has occurred some time in the past, no wait is needed if more than one frame time has passed since the frame switch. This is quite different from prior art techniques that must wait for a vertical blanking interval to occur. The advantages are readily seen with respect to examples utilizing dual frame buffers and triple frame buffers.

For example, in the double buffer case, time is wasted in prior art systems waiting for the vertical blanking interval to occur before the processor instructs the co-processor to switch buffers. In the present invention, the processor draws to the first buffer, instructs the co-processor to wait until the display switch occurs, and continues executing. The system can be configured to terminate the wait at the co-processor at the beginning or end of the vertical blanking interval. Preferably the wait is selected to terminate at the end of the interval. This insures that each frame buffer of data is displayed at least once, as it is possible to perform multiple frame buffer switches during a single vertical blanking period, resulting in at least one frame buffer of data not being displayed.

Thus, the host processor can continue executing and downloading the co-processor while the co-processor waits for the switch to be performed. In particular, the co-processor must wait before writing new data to the switched frame buffer in order to avoid tearing, as that frame buffer continues to be accessed by the display controller for display until the frame buffer switch occurs. In a multiple frame buffer case, such as a system that includes three buffers, the co-processor does not need to wait for the switch to occur before initiating writing to the next frame buffer, as the next frame buffer is identified as the frame buffer that is not part of the switch operation. For example, if the co-processor first writes to frame buffer B and frame buffer A is currently accessed by the display controller for display, the command to switch frame buffers A and B can be completed at the co-processor without the co-processor waiting for the switch to be performed before writing to frame buffer C. When the co-processor has completed draw operations to frame buffer C and the host instructs the co-processor to perform a display buffer switch of frame buffers B and C, it is preferred that the co-processor waits until the switch is performed by the display controller before proceeding with the execution of subsequent commands, such as the writing of data to frame buffer A. This is particularly desirable when the wait is selected to terminate at the beginning of the vertical blanking period in order to ensure that each frame buffer of data is displayed.

The display switch command, FIG. 2*c*, sets a new base address (i.e., a base address for a frame buffer) for the display controller to access for generating the display. Although the function completes at the co-processor immediately, the display does not actually switch buffers until the beginning of the vertical blanking period. This command can be expanded to set two new frame buffers for stereo display for special graphics rendering (FIG. 2*d*). The display switch command (FIGS. 2*c* or 2*d*) when executed immediately prior to the wait until display switch command, causes the co-processor to not execute the next command in the FIFO until a signal is received back from the display controller. Therefore, although the host can continue to issue commands to the co-processor to execute via the FIFO buffer, the co-processor will wait until the switch of buffers occurs before executing any subsequent commands, thereby avoiding tearing.

The destination base address to which renderings can occur can be set using the set destination base command illustrated in FIG. 2*e*. This command, when executed by the co-processor, sets a new base address for rendering operations. The function completes immediately at the co-processor. This command can be synchronized to the vertical retrace interval by preceding the command with the display switch command (FIG. 2*c* or FIG. 2*d*) and the wait until display switch command (FIG. 2*b*).

Thus, the above-described commands can be combined with other rendering commands to enable the host processor to render without incurring delays at the host, or selectively performing certain functions in synchronization with the display hardware.

Figure 3:
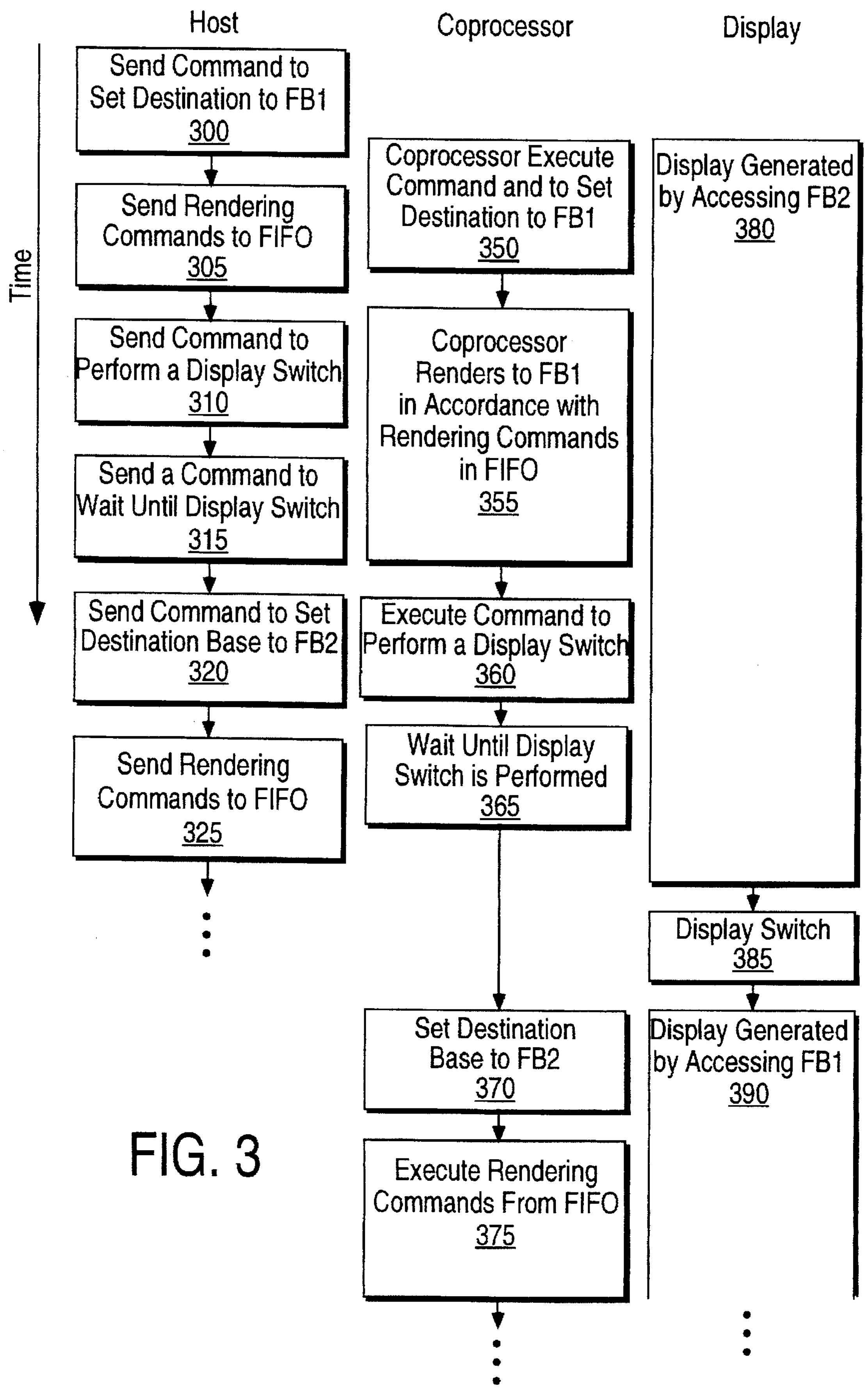
FIG. 3 and FIG. 4 are illustrative flow diagrams illustrating the timing and commands performed by the host and co-processor in accordance with the teachings of the present invention.
Figure 4:
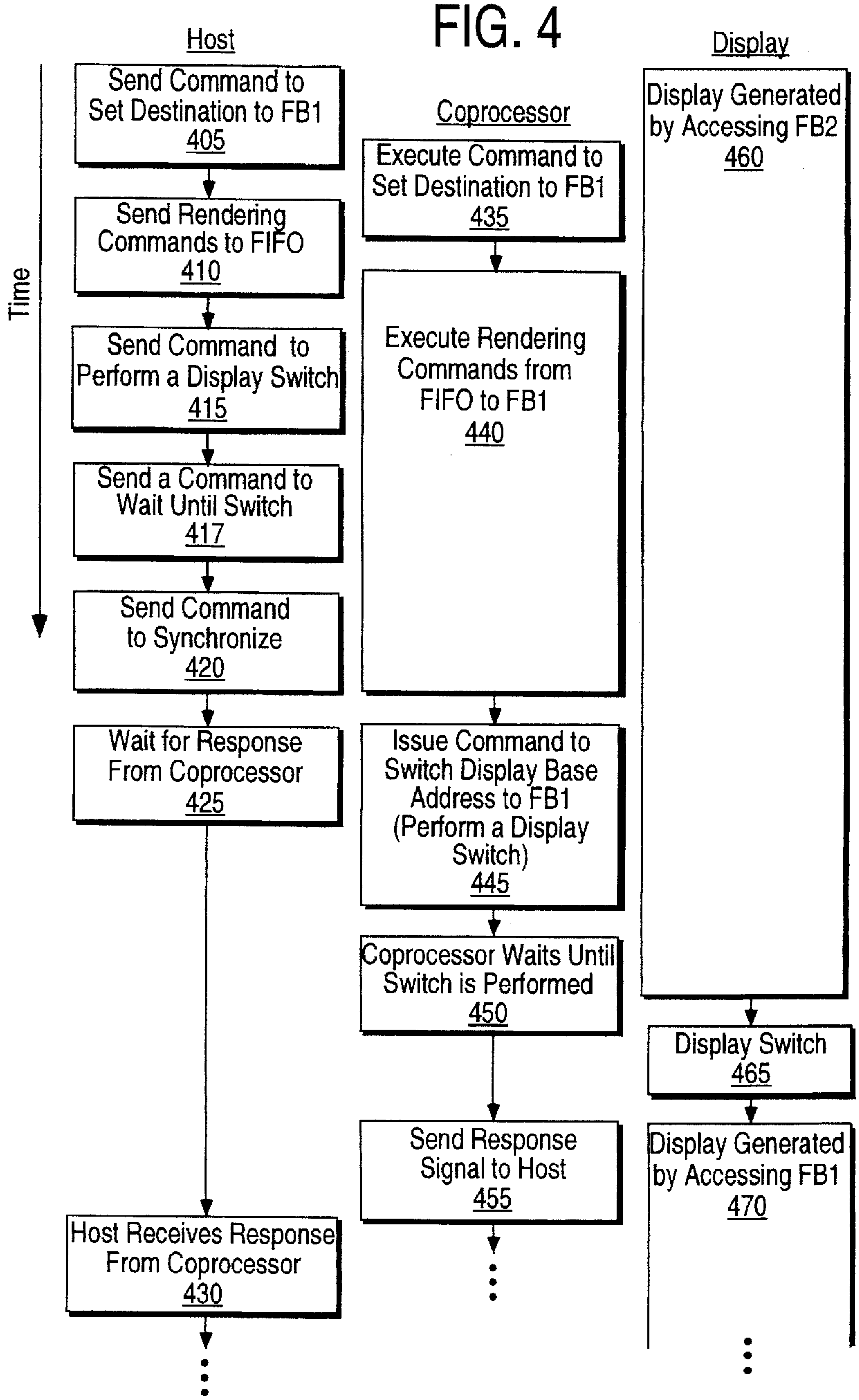

The flow diagrams of FIGS. 3 and 4 illustrate further how flexibility and effectiveness can be achieved using these commands. The simplified flow diagrams illustrate exemplary steps performed by the host processor, co-processor and display controller in an approximate time sequence. However, it is readily apparent that alternate process flows can use these commands in alternate sequences.

Referring to FIG. 3, the host sends the command to set the destination base to the first frame buffer, step 300. This command is received subsequently by the co-processor which causes the co-processor to set the destination frame buffer to the first frame buffer 350. Concurrently, the host sends rendering commands to the co-processor, step 305; in particular, by writing the commands to the FIFO buffer. After the rendering commands are sent, the host can then send a command to perform a display switch, step 310. Once the host sends a command to the FIFO to perform a display switch, the host also issues a wait until display switch command to the co-processor, step 315, and sets a command to set the destination base to the first frame buffer. The host can then immediately start sending additional rendering commands to the FIFO which are to be rendered to the second frame buffer. There is no need for the host to wait for the display switch to occur or to know that a display switch has occurred, thus enabling the host to perform efficiently. At step 355, the co-processor renders to the first frame buffer in accordance with rendering commands stored in the FIFO by the host processor.

After the co-processor, at step 355, renders the image to the destination buffer in accordance with the rendering commands received from the host processor, the co-processor reads from the FIFO the command to instruct the display controller to switch frame buffers, step 360. It is anticipated that this command is executed a time later than the time when the host issued the command to the FIFO buffer. Once the co-processor issues the command to perform a display switch, the command executes immediately at the co-processor. The next command received by the co-processor is the wait until display switch command which causes the co-processor to wait until the display switch is performed during the vertical retrace (step 385). The execution of the command prevents the co-processor from executing subsequent commands, such as rendering commands, that may affect the data in the frame buffers before the display switch is performed during the vertical retrace interval. In addition, in order to avoid tearing, the base address of the destination frame buffer ("destination base") is also preferably switched to an alternate frame buffer, e.g., FB2, during the vertical retrace interval This is accomplished by executing the command to switch the destination base address 320 of the buffer to which the co-processor renders graphic commands immediately subsequent to the wait until display switch command (step 365).

Once the destination base is set to the new frame buffer, step 370, then the rendering commands sent to the FIFO by the host, step 325, can be performed by the co-processor, step 375. At this point, the display controller is accessing the first frame buffer to generate the display, step 390, after having accessed the second frame buffer to generate the display, step 380.

FIG. 4 illustrates another example of the flexibility and efficiency achieved using the system and method of the present invention. For example, if the host processor performed certain commands that required it to be in sync with the co-processor, the following process may be performed. At the beginning of the process the destination base is set to the first frame buffer 405. The host then sends rendering commands to the FIFO, step 410, and at some point sends a command to perform a display switch, step 415.

In this example, it is desirable that the host processor waits until the display switch is performed before issuing additional commands. Whenever the host processor needs to synchronize with the co-processor, the host processor sends the command to synchronize, step 420. In addition, as the command to perform a display switch executes immediately at the co-processor, it is necessary that the command for the co-processor to wait until the display switch occurs is executed, step 417, prior to execution of the synchronize command, step 420. At step 425, the host waits for a reply signal from the co-processor indicating that the co-processor is idle. Once a reply is received (step 430), the host is synchronized with the co-processor and those commands to be performed in synchronization with the co-processor can be executed.

It follows that the co-processor executes those commands in the sequence received from the host processor. At step 435, the co-processor executes the command to set the destination frame buffer to FB1. The rendering commands received are then executed, step 440. A frame buffer display switch is then performed, step 445, and the co-processor waits until completion of the switch (step 465), step 450. Once the display switch has been completed and the co-processor is idle, the reply signal is sent to the host, step 455. At this point, the display controller is accessing the first frame buffer to generate the display, step 470, after having accessed the second frame buffer to generate the display, step 460.

It is readily apparent that these commands can be used in a variety of ways to achieve extreme flexibility as well as efficiency in rendering graphics to a multi-buffered system. The invention has been described in conjunction with the preferred embodiment. It is evident that numerous alternatives, modifications, variations and uses will be apparent to those skilled in the art in light of the foregoing description.

What is claimed is:

1. In a graphics system comprising a host processor, a coupled co-processor, a display controller coupled to a display and a plurality of frame buffers coupled to the display controller and co-processor, a method for selectively batching display commands from the host processor comprising the following steps:

said host processor issuing a first command to the co-processor, which when executed by the co-processor, instructs the display controller to switch access from a first frame buffer to a second frame buffer of the plurality of frame buffers;

said co-processor executing the first command, said display controller delaying the process of switching until a vertical retrace interval occurs;

said host processor issuing a second command to the co-processor, which when executed by the co-processor, causes the co-processor to wait until the display controller switches access before initiating execution of subsequent commands;

said co-processor executing the second command and waiting until the display controller switches access from the first frame buffer to the second frame buffer;

said host processor issuing subsequent commands to the co-processor for execution;

said co-processor postponing execution of the subsequent commands;

said display controller switching access from the first frame buffer to the second frame buffer during the vertical retrace interval of the display;

said co-processor initiating execution of the subsequent commands once the display controller switches access from the first frame buffer to the second frame buffer.

2. The method as set forth in claim 1, wherein the subsequent commands comprise a third command to change a base address of a destination frame buffer to which the co-processor renders pixel data from the second frame buffer to the first frame buffer, said third command issued by the host processor prior to a fourth set of commands comprising commands to render pixel data to the destination frame buffer.

3. In a graphics system comprising a host processor, a coupled co-processor, a buffer coupled to said host processor and said co-processor, a display controller coupled to a display and a plurality of frame buffers coupled to the display controller and co-processor, a method for selectively hatching display commands from the host processor comprising the following steps:

said host processor transmitting a plurality of commands to said buffer, said plurality of commands accessed by said co-processor from said buffer;

said host processor issuing a first command of said plurality of commands to said buffer for retrieval and execution by the co-processor, which when executed by the co-processor, instructs the display controller to switch access from a first frame buffer to a second frame buffer of the plurality of frame buffers;

said co-processor retrieving the first command from said buffer and executing the first command, said display controller delaying the process of switching until a vertical retrace interval occurs;

said host processor issuing a second command of said plurality of commands to said buffer for retrieval and execution by the co-processor, which when executed by the co-processor, causes the co-processor to wait until the display controller switches access before initiating execution of subsequent commands;

said co-processor retrieving the second command from said buffer and executing the second command and waiting until the display controller switches access from the first frame buffer to the second frame buffer;

said host processor issuing subsequent commands of said plurality of commands to said buffer for retrieval and execution by the co-processor;

said co-processor postponing execution of the subsequent commands;

said display controller switching access from the first frame buffer to the second frame buffer during the vertical retrace interval of the display;

said co-processor retrieving the subsequent commands from said buffer and initiating execution of the subsequent commands once the display controller switches access from the first frame buffer to the second frame buffer.

4. In a graphics system comprising a host processor, a coupled co-processor, a display controller coupled to a display and a plurality of frame buffers coupled to the display controller and co-processor, a method for selectively synchronizing the host processor to the co-processor, comprising the following steps:

said host processor issuing at least one first command to the co-processor to execute;

when the host processor is to synchronize with the co-processor, said host processor issuing a second command to the co-processor, which when executed by the co-processor, causes the co-processor to send a reply signal to the host when the co-processor is idle;

said host processor waiting to proceed with subsequent processing until receipt of the reply signal;

said host processor upon receipt of the reply signal, being synchronized with the co-processor.

5. The method as set forth in claim 4, said at least one first command comprising a display switch command, which when executed by the co-processor, instructs the display controller to switch access from a first frame buffer to a second frame buffer of the plurality of frame buffers and a wait command, which when executed by the co-processor, causes the co-processor to wait until the display controller switches access before initiating execution of subsequent commands;

said co-processor executing the display switch command, said display controller delaying the process of switching until a vertical retrace interval occurs;

said co-processor executing the wait command and waiting until the display controller switches access from the first frame buffer to the second frame buffer.

6. In a graphics system comprising a host processor, a coupled co-processor, a display controller coupled to a display and a plurality of frame buffers coupled to the display controller and co-processor, a method for selectively batching display commands from the host processor comprising the following steps:

said host processor issuing a first command to the co-processor, which when executed by the co-processor, instructs the display controller to switch access from a first frame buffer to a second frame buffer of the plurality of frame buffers;

said co-processor executing the first command, said display controller delaying the process of switching until a vertical retrace interval occurs;

said host processor selectively issuing a second command to the co-processor, which when executed by the co-processor, causes the co-processor to wait until the display controller switches access before initiating execution of subsequent commands;

said host processor issuing subsequent commands to the co-processor for execution;

if said host processor issues the second command, said co-processor executing the second command and waiting until the display controller switches access from the first frame buffer to the second frame buffer, said co-processor postponing execution of the subsequent commands, and said co-processor initiating execution of the subsequent commands once the display controller switches access from the first frame buffer to the second frame buffer; and if said host processor does not issue the second command, said co-processor initiating execution of the subsequent commands, in sequence as received from the host processor.

7. A computer graphics system comprising:

a co-processor, said co-processor executing commands received;

a plurality of frame buffers coupled to the co-processor, said co-processor, in response to received rendering commands, rendering graphic image data to a destination frame buffer of the plurality of frame buffers;

a display controller coupled to a display and the plurality of frame buffers said display controller generating a graphic image using graphic data from a display buffer of the plurality of frame buffers;

a host processor coupled to the co-processor, said host processor selectively issuing a first command to the co-processor, which when executed by the co-processor, instructs the display controller to switch the display buffer from a first frame buffer to a second frame buffer of the plurality of frame buffers, said host processor selectively subsequently issuing a second command to the co-processor, which when executed by the co-processor, causes the co-processor to wait until the display controller switches access before initiating execution of subsequent commands, said host processor further issuing subsequent commands to the co-processor for execution;

if the co-processor receives the first command, the co-processor executing the first command received, said display controller delaying the process of switching until a vertical retrace interval occurs; and if the co-processor receives the second command, the co-processor executing the second command and waiting until the display controller switches access from the first frame buffer to the second frame buffer, postponing execution of the received subsequent commands, and initiating execution of the subsequent commands once the display controller switches access from the first frame buffer to the second frame buffer.

8. The system as set forth in claim 7, wherein the subsequent commands selectively comprise a third command to change a base address of a destination frame buffer to which the co-processor renders pixel data from the second frame buffer to the first frame buffer, said third command issued by the host processor prior to a fourth set of commands comprising commands to render pixel data to the destination frame buffer.

9. The system as set forth in claim 7, wherein the subsequent commands further selectively comprise a fifth command to download a color palette, said fifth command issued by the host processor prior to the fourth set of commands.

10. The system as set forth in claim 7, wherein:

when the host processor is to synchronize with the co-processor, said host processor issuing a fifth command to the co-processor, which when executed by the co-processor, causes the co-processor to send a reply signal to the host when the co-processor is idle, said host processor waiting to proceed with subsequent processing until receipt of the reply signal;

wherein host processor upon receipt of the reply signal, is synchronized with the co-processor.

11. The computer graphics system as set forth in claim 7, further comprising a first-in-first-out buffer coupled to said host processor and said co-processor, said first-in-first-out buffer receiving a plurality of commands from said host processor, and transmitting said plurality of commands to said co-processor upon access by said co-processor.

12. A memory having stored therein a plurality of instructions, said instructions executable by a processor and which, when executed by said processor, cause the processor to perform the steps of:

issuing a first command to a co-processor, which when executed by the co-processor, instructs a display controller to switch access from a first frame buffer to a second frame buffer, said switch occurring during a vertical retrace interval;

issuing a second command to the co-processor, which when executed by the co-processor, causes the co-processor to wait until the display controller switches access before initiating execution of subsequent commands;

issuing subsequent commands to the co-processor for execution, said co-processor waiting until the display controller switches access from the first frame buffer to the second frame buffer before executing the subsequent commands.

13. The memory as set forth in claim 12 having further stored therein an instruction which, when executed by said processor, causes said co-processor to issue a first base address to said display controller, said first base address specifying a logical location of said first frame, said first frame buffer providing graphic data to be displayed on a display device coupled to said processor.

14. The memory as set forth in claim 12 having further stored therein an instruction which, when executed by said processor, causes said co-processor to issue a first base address and a second base address to said display controller, wherein said first base address specifies a logical location of said first frame buffer, said first frame buffer storing a first set of frames to be displayed on a display device coupled to said processor; and said second base address specifies a logical location of said second frame buffer, said second frame buffer storing a second set of frames to be displayed on said display device.

* * * * *

UNITED STATES PATENT AND TRADEMARK OFFICE

CERTIFICATE OF CORRECTION

PATENT NO. : 5,657,478
DATED : August 12, 1997
INVENTOR(S) : John Recker and Walter Donovan It is certified that error appears in the above-identified patent and that said Letters Patent is hereby corrected as shown below:

Column 6,
Line 63, "hatching display" should read -- batching display --

Signed and Sealed this

Eighth Day of January, 2002

*Attest:*

JAMES E. ROGAN

*Attesting Officer*

*Director of the United States Patent and Trademark Office*